United States Patent [19]

Yang

[11] Patent Number: 5,333,741
[45] Date of Patent: Aug. 2, 1994

[54] DISPLAY CASE FOR COMPACT DISCS

[76] Inventor: Kyung H. Yang, Inchang-Dong Daemyung Apt. 6-202, Guri-shi, Kyungi-Do, Rep. of Korea

[21] Appl. No.: 71,986

[22] Filed: Jun. 7, 1993

[30] Foreign Application Priority Data

Sep. 17, 1992 [KR] Rep. of Korea .............. 93-17621

[51] Int. Cl.$^5$ .............................................. A47F 7/00
[52] U.S. Cl. .................................... 211/40; 211/128; 211/52
[58] Field of Search .............. 211/40, 41, 50, 128, 211/52; 206/444, 387

[56] References Cited

U.S. PATENT DOCUMENTS

| | | | |
|---|---|---|---|
| 3,897,871 | 8/1975 | Zinnbauer | 211/40 X |
| 4,358,018 | 11/1982 | Wolfe | 211/41 |
| 4,629,067 | 12/1986 | Pavlik et al. | 211/40 X |
| 5,027,955 | 7/1991 | Shoemaker, Jr. et al. | 211/40 |
| 5,027,956 | 7/1991 | Lotufo | 211/50 |
| 5,215,198 | 6/1993 | Sutton | 211/40 |

Primary Examiner—Robert W. Gisbon, Jr.
Assistant Examiner—Sarah A. Lechok
Attorney, Agent, or Firm—Birch, Stewart, Kolasch & Brich

[57] ABSTRACT

A display case for compact discs includes a plurality of album seat grooves having a slanted connecting support, an upper support, a lower hook, a lower support, and an upper hook, whereby it is easy for the customer to read and find the title of the albums displayed in the display case.

4 Claims, 5 Drawing Sheets

CONVETIONAL ART

DISPLAY CASE FOR COMPACT DISCS

BACKGROUND OF THE INVENTION

1. Field of the Invention

The present invention relates to a display case for compact discs and more particularly, to an improved display case for displaying a plurality of compact discs therein at a slant so as to easily read the album title of discs.

2. Description of the Prior Art

Several types of compact disc display cases are known in the art. For example, one of such conventional display cases is shown in FIGS. 1A and 1B. Such conventional compact disc display cases as shown in FIGS. 1A and 1B comprise a plurality of album seat grooves 20 including a plurality of slant partitions 21. Each slant partition 21 is disposed between the album seat grooves 20 and has an incline of 30 degrees.

The album seat grooves 20 are provided with an upper support 21a disposed at an inner surface of the right side slant partition 21 and a lower hook 21b disposed at an inner surface of the left side slant partition 21. Also, the album seat grooves 20 are provided with an upper hook 21d disposed at an inner surface of the right side slant partition 21 and a lower support 21c disposed on a top surface of the left side slant partition 21. The lower support 21c and the upper hook 21 are both disposed in parallel within the album.

SUMMARY OF THE INVENTION

Accordingly, it is an object of the present invention to provide an improved display case for compact discs, which eliminates the above problems encountered with conventional compact disc display cases.

Another object of the present invention is to provide a display case for compact discs with a plurality of album seat grooves 1. Each album seat groove i includes a slant connecting support 3 having an incline of 30 degrees rearward about a perpendicular line as an upper support 2a, a lower hook 2b, a lower support 2c, and an upper hook 2d having an incline of 15-20 degrees forward about the perpendicular line, whereby anyone can easily read the title and name T of the album A.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a display case for compact discs which comprises a plurality of album seat grooves including a slant connecting support with a high height, an upper support, a lower hook, a lower support, and an upper hook, whereby it is easy for the customer to read and find the title of the albums displayed in the display case.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1A:
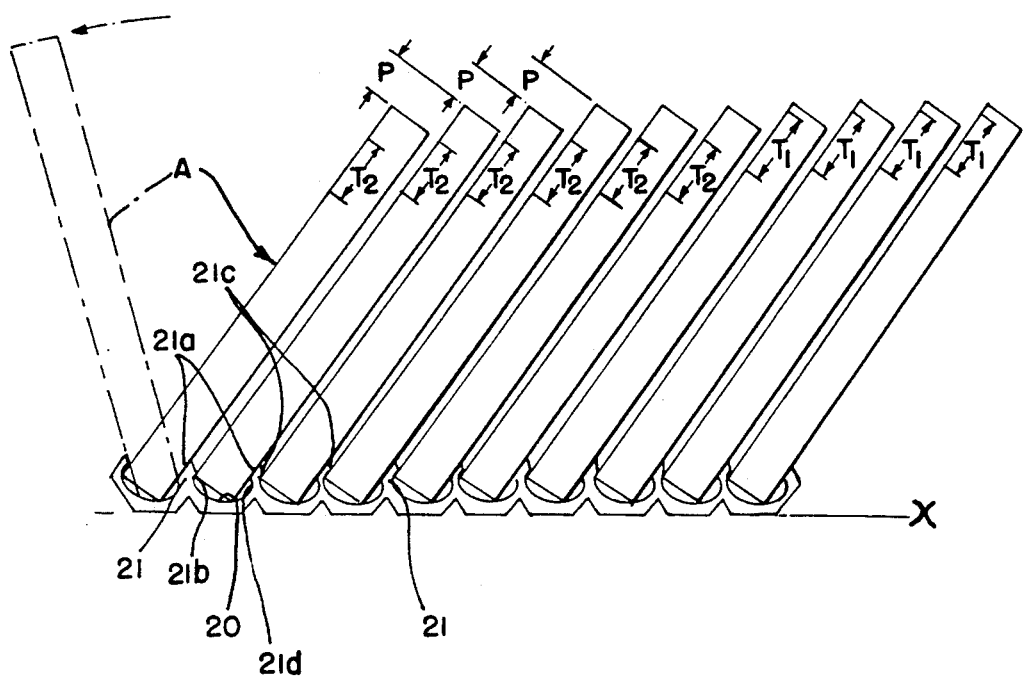
FIGS. 1A and 1B are front elevational views of conventional display cases for compact discs.
Figure 1B:
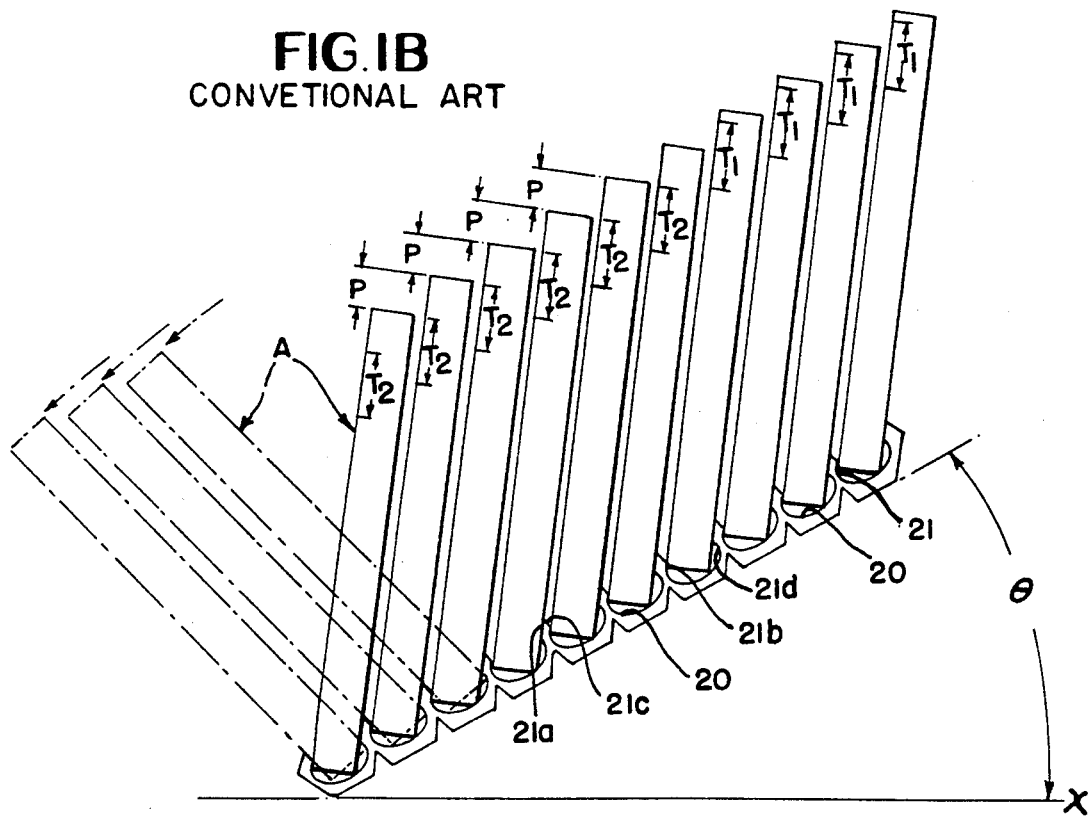
Figure 2A:
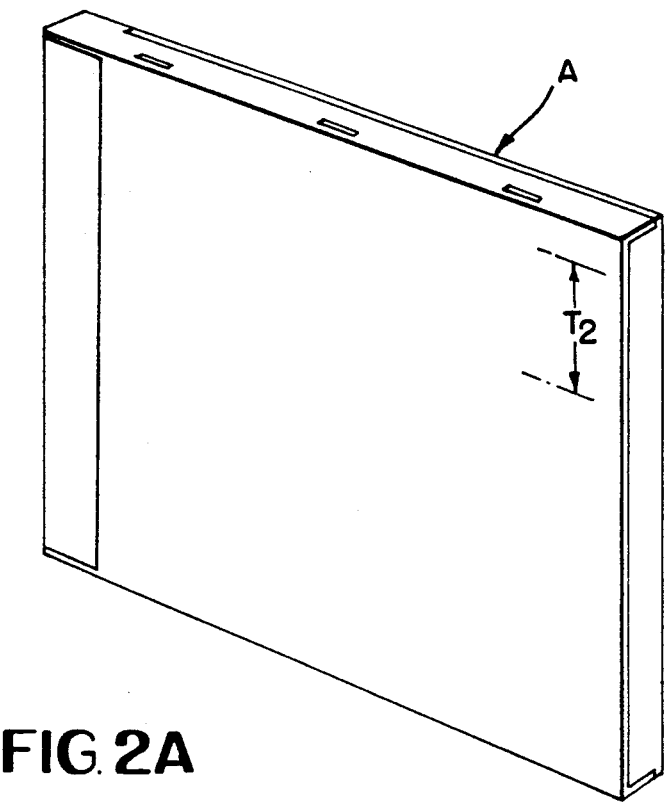
FIGS. 2A and 2B are perspective views of compact disc albums.
Figure 2B:
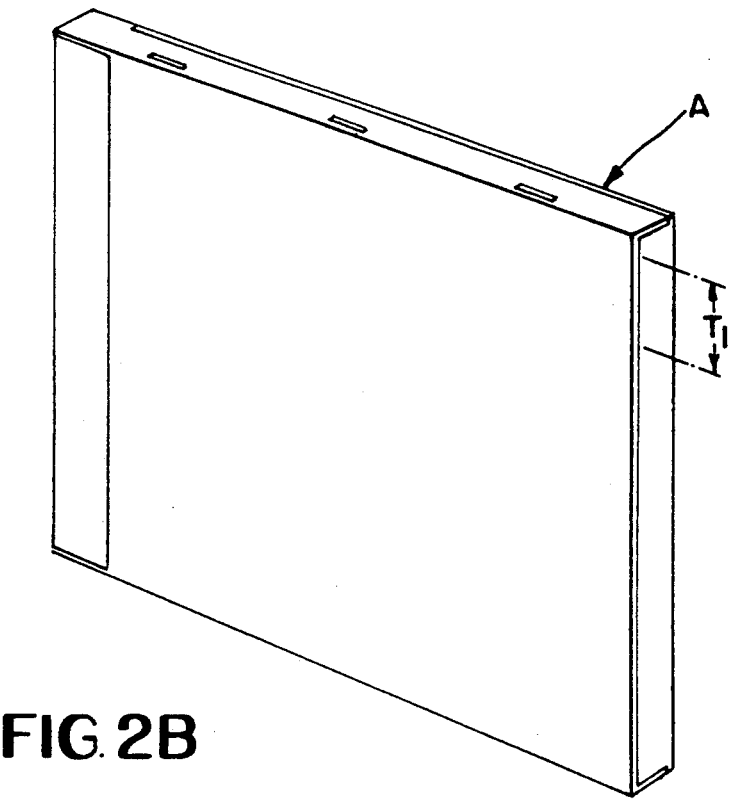
Figure 3:
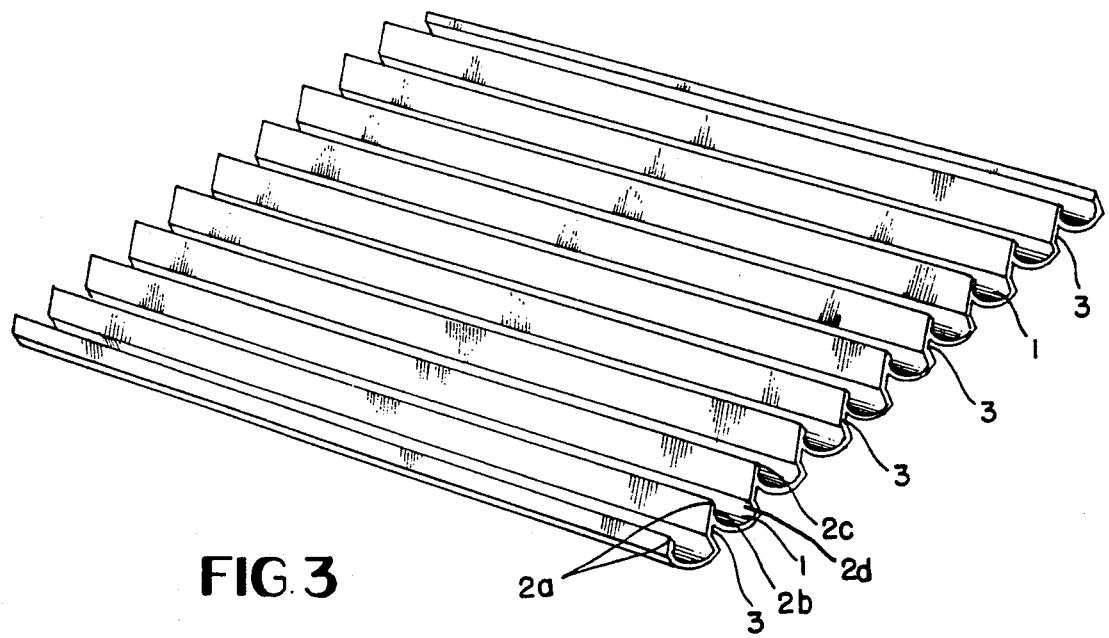
FIG. 3 is a perspective view of the display case for compact discs.
Figure 4:
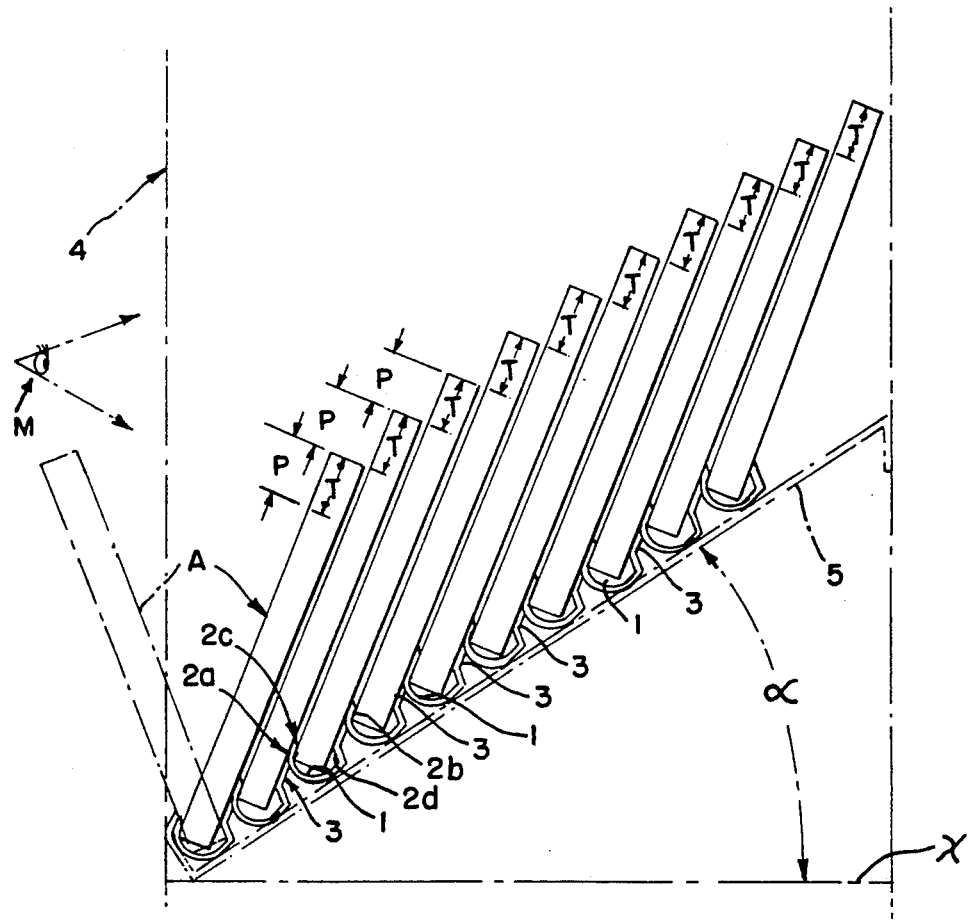
FIG. 4 is a front elevational view of the display case for compact discs showing the case on the slant base and containing a plurality of compact discs.

Referring now in detail to the drawings for the purpose of illustrating preferred embodiments of the present invention, the display case for compact discs as shown in FIGS. 3 and 4, comprises a plurality of album seat grooves 1. Each album seat groove 1 includes a slanted connecting support 3 having an incline of 30° rearward about a perpendicular line as an upper support 2a, a lower hook 2b, a lower support 2c, and an upper hook 2d having an incline of 15°–20° forward about a perpendicular line whereby the user or customer M can easily read the title and name T of the album A. Usually, the display case is disposed on a base which is slanted and has an incline of $\alpha°$ (FIG. 4).

Figure 5:
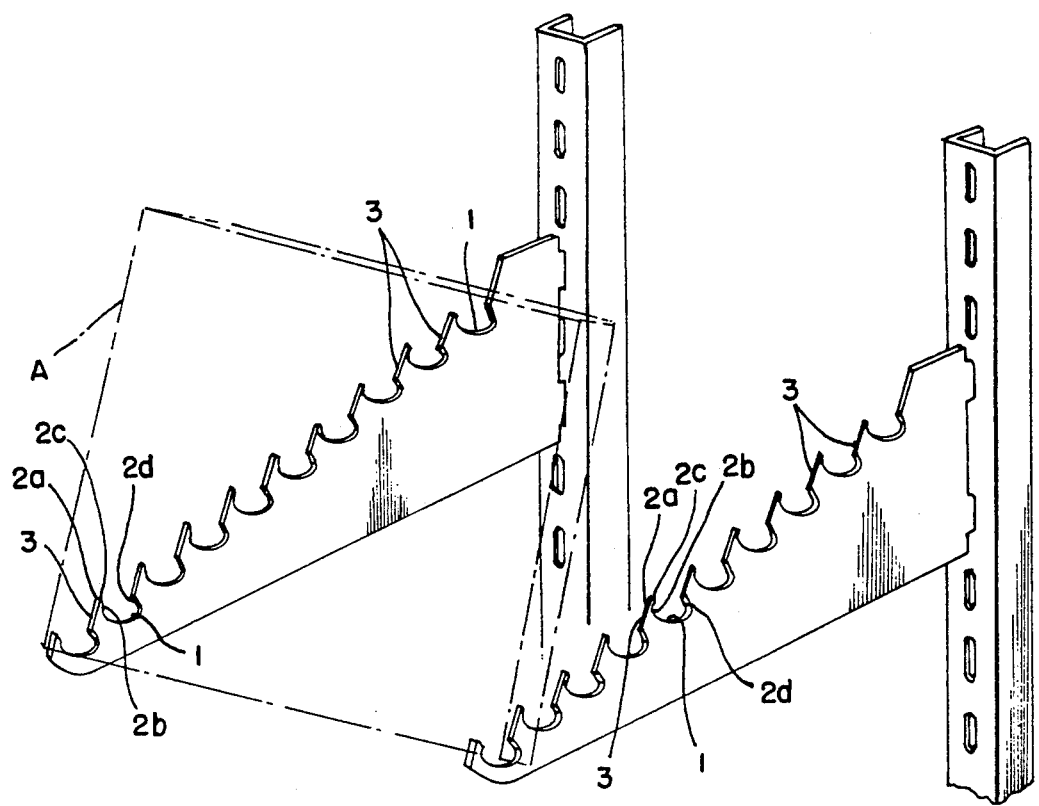
FIGS. 5 and 6 are perspective views of the second embodiment of the display case showing the plurality of album seat grooves disposed on the slant face of the base.
Figure 6:
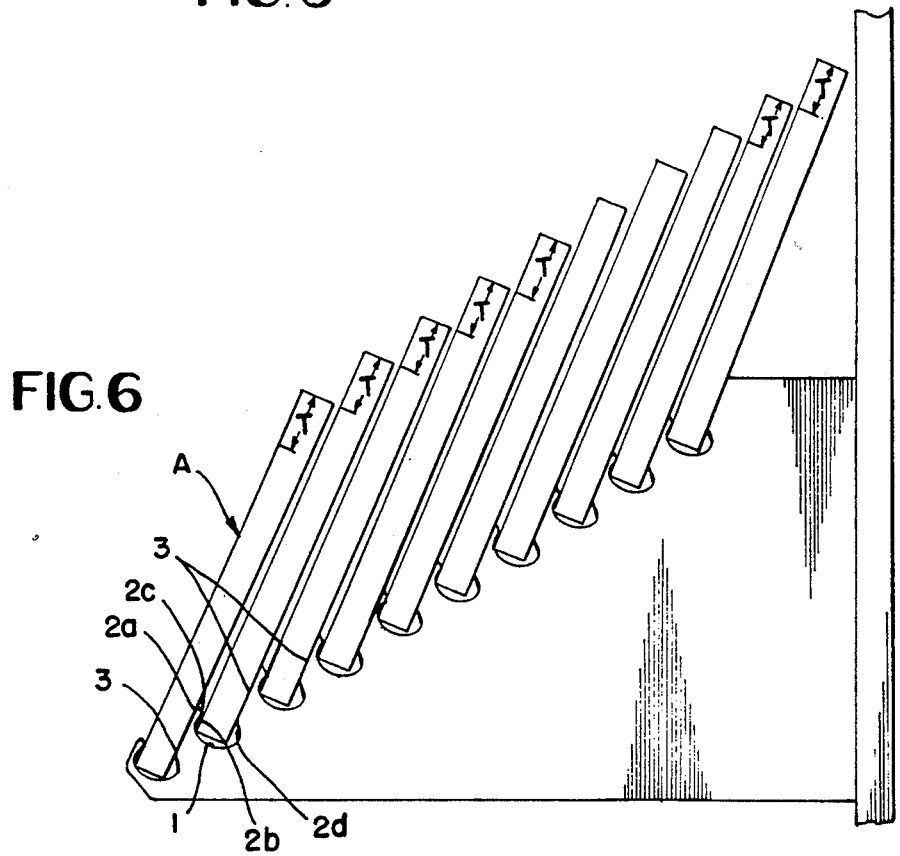

Referring in detail to FIGS. 5 and 6, there is illustrated an additional embodiment of the display case for compact discs in accordance with the present invention. The base has a right-angled triangle configuration and the plurality of sloped album seat grooves 3 are located on the slope surface thereof. In this connection, there are a pair of bases 5 which are inserted into a pair of stands as shown in FIG. 5. Also, as shown in FIG. 6, the pair of bases 5 can be attached to a wall.

Figure 7:
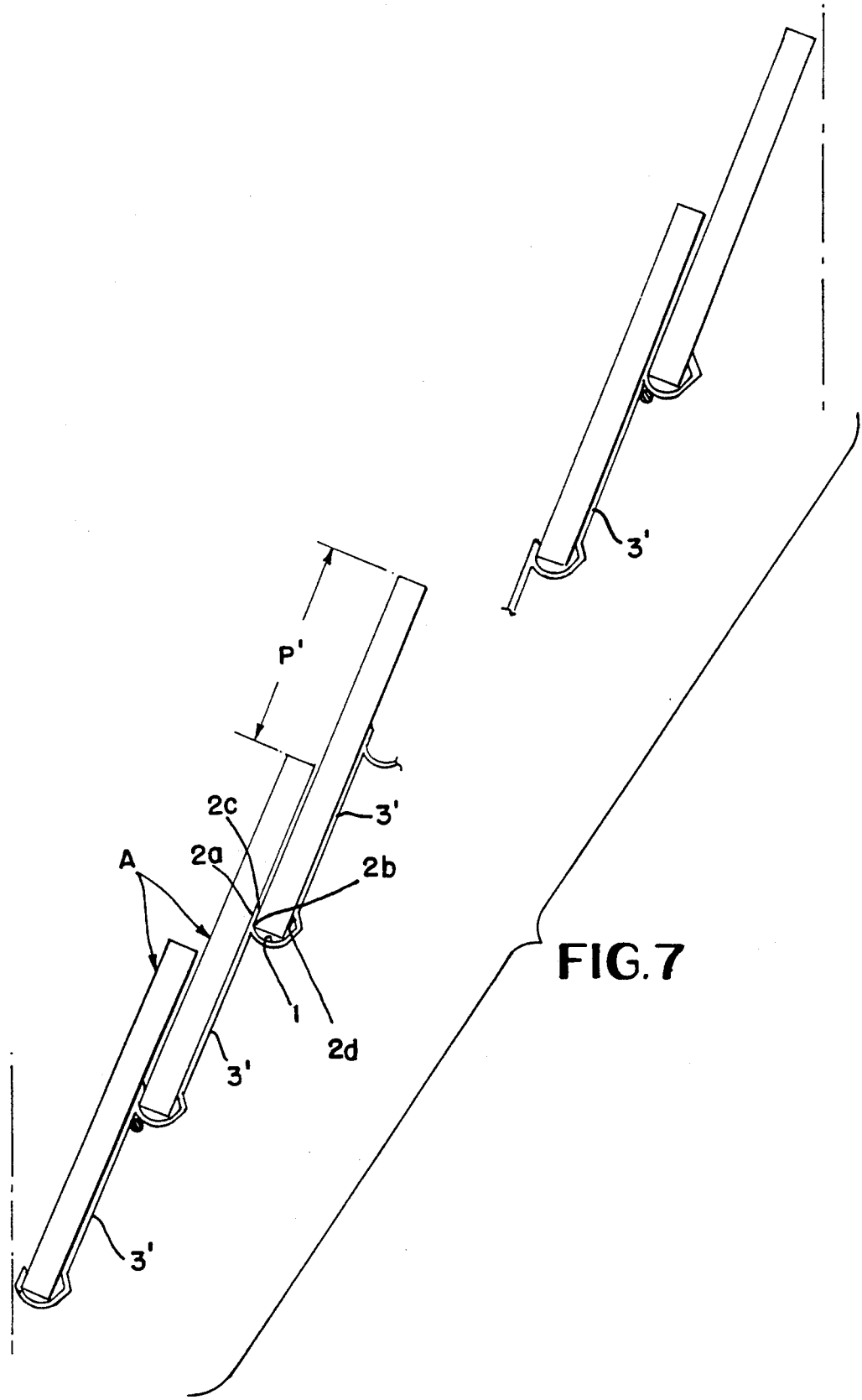
FIG. 7 is a perspective view of the third embodiment of the display case for compact discs showing the album seat groove with a long distance connecting support for giving a precipitous slope of the albums.

Referring in detail to FIG. 7, there is illustrated a third embodiment of the display case for compact discs in accordance with the present invention.

A half portion P' of the album A can be shown in order to read and see the title and picture of the album A while the albums A are displayed in the display case according to the present invention.

The display case for compact discs according to the present invention operates as follows: when the display case of the present invention lays on the slope face of the base having an incline of $\alpha°$, the album seat grooves 1 are laid on the slope face as a kind of steps (FIG. 4). At this time, the plurality of albums A are inserted into the grooves 1, respectively. Therefore, the albums A show the upper portion such as the title and name T of the album so as to easily read the letter or picture printed on the upper portion of the album A. That is, the title and name $T_1$ and $T_2$ can be the title and name T, wherein the user or customer M can easily see the title and name T of the albums inserted into the grooves 1.

As shown in FIGS. 5 and 6, the right-angled triangle configured bases 5 have approximately 30° of incline about the horizontal line X. At this time, the bases can be formed by a conventional dyeing machine. The pair of stands having channeled apertures thereon receive the brackets of right perpendicular lines of the triangle shaped bases 5. At this time, the displayed albums are shown in their T portions of the title and name of the albums A.

As shown in FIG. 7, the albums A disposed in the album seat grooves i have very precipitous slopes thereof in order to show their upper half portions including pictures or letters printed on the upper surface of the album A.

Accordingly, the display cases of the present invention can show the upper portion which show the name, title, picture, and the like of the albums A. Accordingly, it is easy for the customer or user to read and find his desired title and name of the album A.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display case for compact discs, comprising:
    a plurality of album seat grooves for receiving compact disc albums, each of said plurality of album seat grooves including,
    a slanted connecting support having approximately a 30° rearward slant from a vertical line,
    a lower hook,
    a lower support, and
    an upper hook having approximately a 15°–20° forward slant from the vertical line, and a straight base for receiving said album thereon, the straight base having an incline of about 30°, whereby it is easy for the user to read the title and name of the albums displayed therein.

2. The display case of claim 1, wherein said straight base is a right-angled triangle base for receiving the album on the sloped face of the triangle.

3. The display case of claim 2, wherein said right-angled triangle base is attached to a pair of stands.

4. The display case of claim 1, wherein said connecting support has a maximum height less than one-half a height of the album.

* * * * *